March 23, 1954 — A. B. SCHNEITHORST — 2,672,845
APPARATUS FOR KEEPING AQUATIC CREATURES ALIVE
Filed June 24, 1953

Arthur B. Schneithorst,
Inventor.
Koenig and Pope,
Attorneys.

Patented Mar. 23, 1954

2,672,845

UNITED STATES PATENT OFFICE 2,672,845

APPARATUS FOR KEEPING AQUATIC CREATURES ALIVE

Arthur B. Schneithorst, Clayton, Mo., assignor to Schneithorst's Live-Pak Seafoods, Inc., St. Louis, Mo., a corporation of Illinois Application June 24, 1953, Serial No. 363,707

5 Claims. (Cl. 119—5)

This invention relates to apparatus for keeping aquatic creatures alive, and more particularly to such apparatus for use in restaurants to keep alive such edible aquatic creatures as lobsters or trout.

Among the several objects of the invention may be noted the provision of apparatus of the class described including a tank for containing water, and means for maintaining the water clean, aerated, and at a proper temperature for keeping aquatic creatures alive and in good condition until the time of cooking; the provision of apparatus of this class particularly for use in a restaurant for keeping lobsters alive, and which is also useful, simply by changing from use of sea water in the tank to fresh water, for keeping trout alive and in good condition when lobsters are out of season; the provision of apparatus of this class which is adapted to provide suitable water conditions for keeping lobsters, and to provide for flow of a current around the tank thereby keeping the trout active so that they stay in better condition as well as enhancing their display value; and the provision of apparatus of this class which is reliable in operation and economical to maintain. Other objects and features will be in part apparent and in part pointed out hereinafter.

The invention accordingly comprises the constructions hereinafter described, the scope of the invention being indicated in the following claims.

In the accompanying drawings, in which one of various possible embodiments of the invention is illustrated, Fig. 1 is a plan of an apparatus of this invention, with part of the tank bottom broken away;

Corresponding reference characters indicate corresponding parts throughout the several views of the drawings.

Figure 1:
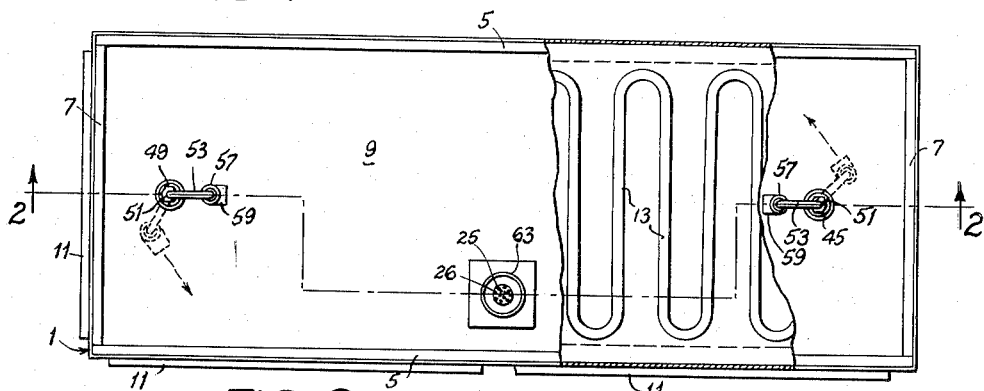
Figure 2:
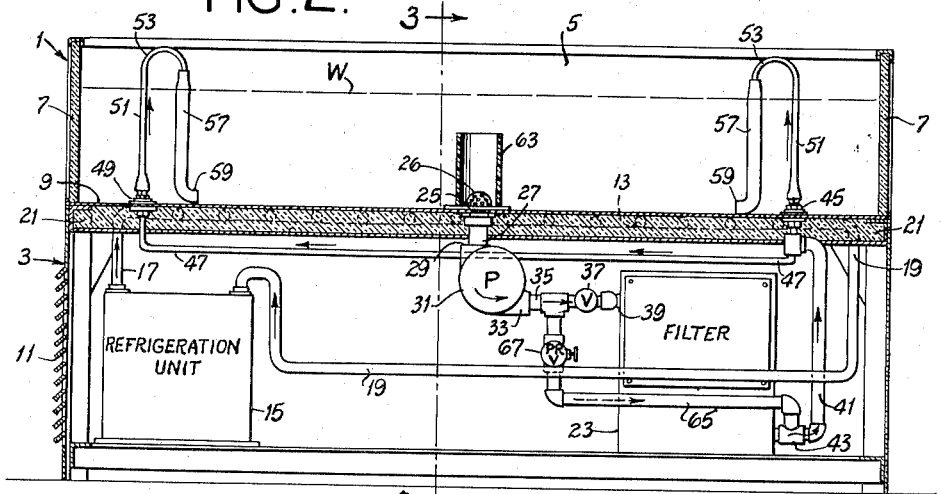
Fig. 2 is a longitudinal vertical section taken generally on line 2—2 of Fig. 1.
Figure 3:
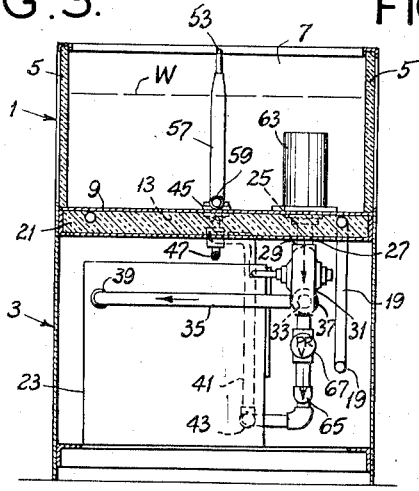
Fig. 3 is a transverse vertical section taken substantially on line 3—3 of Fig. 2; and, Fig. 4 is an enlarged fragment of Fig. 2 with parts broken away and shown in section.

Referring to the drawings, an apparatus of this invention is shown to comprise a tank 1 on a cabinet 3. The tank is of long rectangular shape in plan, and has glass side walls 5, glass end walls 7 and a flat bottom 9, preferably consisting of a stainless steel sheet. The tank is open at the top. The bottom 9 forms the top of the cabinet 3, the walls of which have louvers 11 for entry of air into the cabinet interior. The tank is partly filled with water W: sea water for keeping lobsters, fresh water for keeping trout. The sea water may be natural sea water or a simulated sea water. Obviously, in places remote from the sea coast, simulated sea water will be used. The term "sea water" as herein used is intended to cover either natural or simulated sea water.

A typical simulated sea water is one made by adding to about 85 gallons of fresh water approximately 11 lbs., 7 oz. of sodium chloride; 2 lbs., 14 oz. of magnesium sulfate; 2 lbs., 5 oz. of magnesium chloride; 15 oz. of calcium chloride; 20 g. of potassium bromide, and 20 g. of sodium acid carbonate. Commercial grades as well as C. P. and U. S. P. grades of the chemical components may be employed. The pH of this mixture is then adjusted to a value of between approximately 7.5 to 8.2, or preferably about 8.0. This may be done by adding an acid or a base (to decrease or increase the pH, respectively) which in solution ionizes to give ions which are already present in the mixture, such as for example, hydrochloric acid or sodium hydroxide.

To the underside of the tank bottom 9 is brazed a cooling coil 13. A refrigerant is circulated through this coil from a conventional refrigeration unit 15 housed in the cabinet 3. The refrigerant supply and return lines are designated 17 and 19, respectively. This refrigerates the water W in the tank by heat exchange through the tank bottom. A layer of insulation 21 is provided on the underside of the coil 13. The refrigeration is preferably such as to maintain the water at a temperature of about 40° F. to 44° F. for lobsters, 42° F. to 46° F. for trout. The water can be maintained at the desired temperature by means of any conventional thermostatically controlled switch (not shown) connected to the refrigeration unit 15.

The water in the tank is maintained clean by being circulated through a filter 23. In the bottom of the tank is a drain 25 having a perforated cap 26 for coarse filtration from which a drain pipe 27 leads to the inlet 29 of a pump 31. The drain is located generally centrally of the length of the tank and in the center or toward one of its sides. The outlet 33 of the pump is connected via a pump outlet line 35 having a shut-off valve 37 to the inlet of the filter at 39. A delivery line 41 leads from the outlet 43 of the filter to a fitting 45 in the bottom of the tank located generally centrally of the width of the tank and adjacent one end of the tank. A pipe 47 leads from the end of line 41 to a corresponding fitting 49 in the bottom of the tank, also located generally centrally of the width of the tank, adjacent the other end of the tank.

Figure 4:
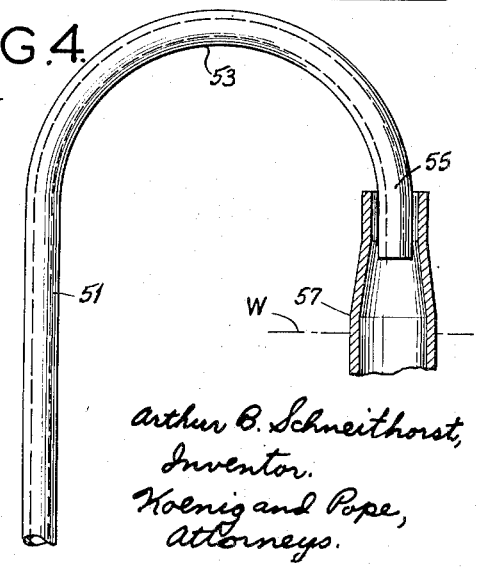

Each of the fittings 45 and 49 has a pipe 51 extending upward therefrom in the tank to an elevation higher than the level of water in the tank. Each pipe 51 has a reverse bend 53 at its upper end above the water level to provide pipe end portions 55 which project downward toward the tank, Fig. 4, with the lower ends of portions 55 above the water level. These lower ends of portions 55 are open. The pipes 51 are rotary at their lower ends on the fittings 45 and 49. A tube 57 extends down from the end portion 55 of each pipe, having its lower end bent to extend horizontally, as indicated at 59, and resting on the tank bottom 9. Each tube 57, at its upper end, is of somewhat larger diameter than that of the respective pipe 51 and receives the end portion 55 of the respective pipe 51 with such a loose fit as to allow for entry of air into the upper end of the tube for entrainment of air in the water flowing out of the lower end of 55 and down through the tube 57 to the bottom of the tank. Each tube 57 is rotary on 55 so that the angle of the horizontal lower end 59 of the tube with respect to the sides of the tank may be readily varied at will. Each tube 57 is of somewhat reduced diameter at its upper end.

The filter unit 23 preferably is one in which water is forced through a series of asbestos filters. Exemplary asbestos filters are made of asbestos fibers matted in a one-quarter inch thick pad having a surface area of approximately 400 to 600 square inches, and having a porosity which is retentive to lyophobic and lyophilic dispersoids of approximately 0.5 micron diameter. The matted fiber pads are supported in stainless steel mesh screens. It is preferred to use a filter capable of filtering five to ten gallons per minute at pressures not greater than about 25 p. s. i.

A tube or collar 63, preferably of clear plastic, is shown as surrounding the drain 25 and extending up from the tank bottom for some distance, its upper end being below the water level. This tube prevents lobsters from crawling over the drain 25 and cutting down the rate of circulation of water.

The apparatus is also shown as including a pipe line 65 for by-passing the filter 23, leading from line 35 rearward of the shut-off valve 37 to the line 41. In line 65 is a pressure relief valve 67 adapted to open either when valve 37 is shut, or when the filter 23 becomes so clogged as to raise the pressure in line 35 to a value in excess of a predetermined value, e. g., 25 p. s. i.

Operation is as follows:

For keeping lobsters, the tank is filled with sea water, care being taken that the water level is below the lower ends of the portions 55 of pipes 51. The pipes 51 are preferably positioned in the central longitudinal vertical plane of the tank and the tubes 57 are positioned with their lower outlet ends 59 in alignment and directed toward one another, as illustrated in solid lines in Fig. 1. Live lobsters are placed in the sea water in the tank, and the pump 31 is continuously operated to withdraw water from the tank via drain 25, force the water (preferably at a rate of five to ten gallons per minute) through filter 23, and return it to the tank via lines 41 and 47, fittings 45 and 49, pipes 51 and tubes 57. The clean water returning to the tank is aerated by reason of entrainment of air therein as it issues from the lower ends of the downwardly projecting portions 55 of pipes 51. The refrigeration apparatus is operated to maintain the water in the tank at a temperature preferably from 40° F. to 44° F.

Thus, the water is maintained refrigerated, aerated and clean, the filtration removing bacteria and other deleterious filterable material from the water, which would otherwise cause the lobsters to die. By reason of the refrigeration, aeration and filtration, the lobsters are kept under conditions closely approximating natural conditions, remain alive for a long period (as much as four weeks, for example), and regain their natural moisture content (lost in shipment) necessary for finest flavor. Approximately 125 pounds of lobsters may be kept alive in tanks of the present invention containing approximately 85 gallons of sea water (exemplary dimensions of tank 1; 6 feet by 32 inches by 15 inches).

With the lower ends 59 of tubes 57 positioned as described, aerated water issues therefrom in directly opposed streams, which tend to cancel one another out so as to avoid a continuous current circulating in the tank. Also, the opposed streams of water tend to wash lobster excrement and any other debris toward the center of the tank and to the drain, thus facilitating keeping the water clean. If heavier-than-water debris collects to an objectionable degree around the lower end of tube 63, a cap is placed on the top of tube 63 having a hose extending downward alongside the tube, thereby to draw off such debris.

In case the filter 23 becomes clogged, continuous circulation of water is maintained (though without filtration) by means of the by-pass line 65. By shutting off valve 37, the clogged filter pads of the filter may be removed and fresh pads inserted, and normal operation quickly resumed before the lobsters are deleteriously affected.

For keeping trout, the sea water is replaced by fresh water, and operation is generally the same as above described, except that pipes 51 are swung to angled positions such as shown in dotted lines in Fig. 1, and tubes 57 are angled to direct the streams of water issuing from their lower ends 59 toward opposite sides of the tank, thereby to create a continuous current around the tank. This current aids in keeping the trout active and hence in better condition, noting that trout are inactive in relatively still water, but will remain active in a current by swimming against the current. By keeping the trout swimming against the current around the tank, their display value is enhanced.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. Apparatus for keeping alive aquatic creatures, particularly lobsters or trout, comprising an elongate tank for containing sea water or fresh water, means for cooling the water in the tank, the tank having a drain in its bottom located generally centrally with respect to the length of the tank, and means for filtering and aerating water withdrawn from the tank through the drain and returning it to the tank comprising a pair of pipes extending up from the bottom of the tank adjacent the ends of the tank, each pipe having a reverse bend at its upper end providing an end portion projecting downward toward the tank, a tube extending down from the end portion of each pipe and having its lower end bent to extend horizontally and resting on the tank bottom, said tube, at its upper end, being larger than the pipe and receiving the end portion of the pipe with such a loose fit as to allow for entrainment of air in water flowing out of the end of the pipe and to allow for rotation of the tube with respect to the pipe, and a pump and a filter for pumping and filtering water withdrawn from the tank and delivering it to the pipes.

2. Apparatus for keeping alive aquatic creatures, particularly lobsters or trout, comprising an elongate tank for containing sea water or fresh water, means for cooling the water in the tank, the tank having a drain in its bottom located generally centrally with respect to the length of the tank, and means for filtering and aerating water withdrawn from the tank through the drain and returning it to the tank comprising a pair of fittings in the bottom of the tank located adjacent the ends of the tank and generally on the longitudinal center line of the tank, a pipe extending upward from each fitting and rotary on its vertical axis, each pipe having a reverse bend at its upper end providing an end portion projecting downward toward the tank, a tube extending down from the end portion of each pipe and having its lower end bent to extend horizontally and resting on the tank bottom, said tube, at its upper end, being larger than the pipe and receiving the end portion of the pipe with such a loose fit as to allow for entrainment of air in water flowing out of the end of the pipe and to allow for rotation of the tube with respect to the pipe, and a pump and a filter for pumping and filtering water withdrawn from the tank and delivering it to the pipes.

3. Apparatus for keeping alive aquatic creatures, particularly lobsters or trout, comprising an elongate tank for containing sea water or fresh water, means for cooling the water in the tank, the tank having a drain in its bottom located generally centrally with respect to the length of the tank, and means for filtering and aerating water withdrawn from the tank through the drain and returning it to the tank comprising a pair of pipes having end portions located adjacent to the ends of the tank projecting downward toward the tank, a tube extending down from the end portion of each pipe and having its lower end bent to extend horizontally and resting on the tank bottom, said tube, at its upper end, being larger than the pipe and receiving the end portion of the pipe with such a loose fit as to allow for entrainment of air in water flowing out of the end of the pipe and to allow for rotation of the tube with respect to the pipe, a pump and a filter for pumping and filtering water withdrawn from the tank and delivering it to the pipes, said pump being connected to the filter via a pump outlet line having a shut-off valve, a delivery line leading from the outlet of the filter, and a by-pass line connecting the pump outlet line rearward of the shut-off valve to the delivery line and including a pressure relief valve.

4. Apparatus for keeping alive aquatic creatures, particularly lobsters or trout, comprising an elongate tank having glass sides and ends for containing sea water or fresh water, means for cooling the water in the tank, the tank having a drain in its bottom located generally centrally with respect to the length of the tank, and means for filtering and aerating water withdrawn from the tank through the drain and returning it to the tank comprising a pair of fittings in the bottom of the tank located adjacent the ends of the tank and generally on the longitudinal center line of the tank, a pipe extending upward from each fitting and rotary on its vertical axis, each pipe having a reverse bend at its upper end providing an end portion projecting downward toward the tank, a tube extending down from the end portion of each pipe and having its lower end bent to extend horizontally and resting on the tank bottom, said tube, at its upper end, being larger than the pipe and receiving the end portion of the pipe with such a loose fit as to allow for entrainment of air in water flowing out of the end of the pipe and to allow for rotation of the tube with respect to the pipe, a pump and a filter for pumping and filtering water withdrawn from the tank and delivering it to the pipes, said pump being connected to the filter via a pump outlet line having a shut-off valve, a delivery line leading from the outlet of the filter, and a by-pass line connecting the pump outlet line rearward of the shut-off valve to the delivery line and including a pressure relief valve.

5. Apparatus as set forth in claim 4, wherein the means for cooling the water in the tank comprises refrigeration coils affixed to the tank bottom and means for circulating a refrigerant through the coils.

ARTHUR B. SCHNEITHORST.

References Cited in the file of this patent

UNITED STATES PATENTS

| Number | Name | Date |
|--------|------|------|
| 881,488 | Rochow | Mar. 10, 1908 |
| 1,547,258 | Newton | July 28, 1925 |
| 2,594,474 | McGrath | Apr. 29, 1952 |